(12) United States Patent
Piko et al.

(10) Patent No.: US 6,249,985 B1
(45) Date of Patent: Jun. 26, 2001

(54) POSITIONING PROCESS AND SYSTEM

(76) Inventors: Helmut Piko, Rhababerweg 25a, Berlin (DE), 12357; Thorsten Zunker, Gürtlerweg 17a, Berlin (DE), 12355

(*) Notice: Subject to any disclaimer, the term of this patent is extended or adjusted under 35 U.S.C. 154(b) by 0 days.

(21) Appl. No.: 09/308,026

(22) PCT Filed: Nov. 12, 1997

(86) PCT No.: PCT/EP97/06389

§ 371 Date: May 12, 1999

§ 102(e) Date: May 12, 1999

(87) PCT Pub. No.: WO98/21545

PCT Pub. Date: May 22, 1998

(30) Foreign Application Priority Data

Nov. 12, 1996 (DE) .............................................. 196 48 864

(51) Int. Cl.$^7$ ........................................... G01B 5/20
(52) U.S. Cl. .............................................. 33/503; 33/549
(58) Field of Search .............................. 33/503, 549, 551, 33/552, 553, 554, 562, 568, 569, 570, 573; 269/24, 71, 309, 900

(56) References Cited

U.S. PATENT DOCUMENTS

| | | | |
|---|---|---|---|
| 2,676,414 | * 4/1954 | Derry | 33/534 |
| 4,145,006 | * 3/1979 | Webb | 269/71 |
| 4,502,457 | * 3/1985 | Marron | 269/71 |

(List continued on next page.)

FOREIGN PATENT DOCUMENTS

| | | |
|---|---|---|
| 1 402 895 | 12/1968 | (DE) . |
| 22 32 858 | 1/1973 | (DE) . |
| 34 06 045 | 8/1985 | (DE) . |
| 37 17 541 | 12/1987 | (DE) . |
| 37 40 070 | 6/1989 | (DE) . |
| 195 10 456 | 9/1995 | (DE) . |

(List continued on next page.)

OTHER PUBLICATIONS

Prospectus entitled "Five U–Nique™" published by DEA –Brown–Sharpe SpA, Moncalieri, IT, dated 10/96, pp 1–16.
Product Brochure of Spindler & Hoyer GMBH & Co., pp S1–S35, 1995.

*Primary Examiner*—Christopher W. Fulton
(74) *Attorney, Agent, or Firm*—Cohen, Pontani, Lieberman & Pavane (57) ABSTRACT

A process and device are disclosed for positioning devices for temporarily fixing a workpiece in any desired angular position in a three-dimensional working space of which the coordinates are known, in particular when the workpiece requires a multidimensional support A computer-controlled machine with a tool movable in the direction of all co-ordinates is used for that purpose, together with a freely movable, vertically adjustable device or supporting column mounted on a base plate and upon which the supporting device for the multidimensional support of the workpiece is positioned. Based on the tool geometry or a C.A.D. programme, a coupling or an appropriately designed measurement head of a measurement machine is fixed on the tool with respect to a calculated plane of reference for the tool and to an axis inclined in relation thereto which cuts the plane of reference. The coupling parts designed as a coupling are then brought to a position at the tool or device which corresponds to the plane of reference, either directly by means of driven coupling parts or after a previous adjustment on an adjustment device placed on the base plate. The tool or measurement head is then moved into the precalculated position in space of the support of the workpiece and a supporting column with a corresponding supporting device is aligned with the position of the tool. The disclosed process steps and the positioning systems used to implement the process enable a three-dimensional supporting surface to be provided within a few minutes for a workpiece to be measured or machined, with an accuracy of more than 0.1 mm.

15 Claims, 11 Drawing Sheets

U.S. PATENT DOCUMENTS

| | | | | |
|---|---|---|---|---|
| 4,564,179 | * | 1/1986 | Hollingsworth | 269/71 |
| 4,593,476 | * | 6/1986 | Clark et al. | 33/551 |
| 4,669,227 | * | 6/1987 | Treppner | 33/570 |
| 4,848,005 | | 7/1989 | Ercole et al. | 33/568 |
| 5,107,599 | * | 4/1992 | Marincic et al. | 33/573 |
| 5,193,286 | * | 3/1993 | Collier | 33/551 |
| 5,224,716 | | 7/1993 | Saeda et al. . | |
| 5,918,867 | * | 7/1999 | Goodyear | 269/71 |

FOREIGN PATENT DOCUMENTS

| | | |
|---|---|---|
| 44 24 765 | 1/1996 | (DE) . |
| 196 40 579 | 4/1997 | (DE) . |
| 216 041 | 4/1987 | (EP) . |
| 2 268 894 | 1/1994 | (GB) . |
| 2 693 148 | 1/1994 | (FR) . |
| 2 310 929 | 9/1997 | (GB) . |

* cited by examiner

POSITIONING PROCESS AND SYSTEM

BACKGROUND OF THE INVENTION

1. Field of the invention

The invention relates to a method and a device for positioning a clamping device for workpieces within a predetermined working space.

The invention is described hereafter essentially with reference to a measuring machine and a positioning and clamping system provided for it, but is not restricted to measuring machines of this kind, instead being capable of being used in the same way for positioning systems with the aid of triaxially controllable robot systems for a tool. The system is, to that extent, suitable both for measuring machines and for processing machines.

2. Discussion of the Prior Art

Workpieces of any contour, in order to be accurately measured or processed, must be temporarily fixed within a specific three-dimensional space corresponding to the range of the measuring system or processing machine. Where measuring machines are concerned, this space is delimited in the plane by a measuring plate, a measuring table or a clamping plate, and the third dimension is determined by the range of the measuring tracer on a measuring bridge or a measuring boom (DE 22 32 858 A2 and DE 37 17 541 A1).

Adjustable columns, which can be locked with pin-point accuracy on the clamping plate, serve as clamping devices or seating columns for the workpiece. These include devices, such as are known, for example, from DE 44 24 765 A1 or U.S. Pat. No. 4,848,005.

A complete software-controlled measuring machine "TYPHOON" with a "Five Unique" clamping device was published in a prospectus of the same name by the company DEA-Brown-Sharpe SpA, Moncalieri, IT.

With the aid of the measuring machines or measuring robot, a reference point corresponding to a clamping point of the workpiece is approached in the three-dimensional measuring space surrounding the workpiece. A support or clamping column, which can be fixed on the measuring table, is then placed under this clamping point, as a rule by displacing the column as accurately as possible, manually or mechanically (U.S. Pat. No. 4,848,005), in the horizontal plane (XY-axis) and adjusting its height (Z-axis) vertically. The other clamping points are found and fixed in the same way.

A CAD program or a drawing of the workpiece, which are edited for software processing in the measuring machine, serves as an aid. In addition, the measuring rod or tracer of the measuring machine is replaced by a removable centering device which serves as a complementary simulated workpiece point at the clamping point of the column to be positioned. The centering device has a coupling element, for example a gripper or a ball catch, so that the column to be positioned can be coupled positively. This complicated positioning method is described in detail in DE 195 10 456 A1, as are some clamping means which can be used for fixing the workpieces.

Turntables with positioning accuracies of below +/–0.05° absolute accuracy, which are equipped with stepping motors or servomotors, are also known for positioning components at specific angles in one plane. The positioning accuracy is achieved by means of limit switches which utilize the Hall effect. Turntables of this kind bearing the type designation RTM are offered by the company Spindler & Hoyer GmbH & Co, Göttingen, Del.

Measuring columns movable on a measuring plate may be used, according to EP-B-0,216,041 for the automatic detection of individual measuring points even of very large components.

It is not possible, with the systems mentioned, to simulate a seating surface of any position and extent in the three-dimensional measuring space, that is to say working space, or to provide for a seating surface of this kind a column with a plane or curved clamping surface or otherwise spatial clamping surface; at least not when the position of the surface in the space assumes any solid angle which deviates from the angles standardized in grid systems, such as 15°, 30°, 45°, etc.

As regards the details of the clamping elements, centering balls and other details of the measuring machine, measuring plate and columns for the workpiece seatings and their functioning, reference is made to the publications mentioned here, and the description of these, by being quoted, is included in the disclosure of this invention. This applies insofar as other systems are not described for preference here.

SUMMARY OF THE INVENTION

The problem on which the invention is based, therefore, is to provide any clamping surface or multidimensional clamping and positioning device within the working space, so that a multidimensional clamping surface or correspondingly disposed clamping points for workpieces can be arranged on a corresponding positioning device.

The invention is based on the notion that, with the previous methods and positioning systems of the automatic or manual type, only point seatings or concrete points can be positioned accurately in order to seat the workpiece. In many cases, the workpiece surface, which serves for seating the workpiece or with which the workpiece is to be fastened to other parts, is not plane or does not have any horizontal extent in the working space, the coordinates of which are known. In these cases, for example if a seating surface has any solid angle, punctiform seating of the workpiece is inaccurate or leads to inaccurate temporary clamping of the workpiece. It was expedient, here, to find an economical, simple and cost-effective solution, using the hitherto conventional robot systems or measuring machines, in particular an arrangement for the measurement of workpieces. According to the prior art, it is necessary, in order to obtain a spatially arranged seating surface for the workpiece, to manufacture a special seating means which was capable of being placed on the punctiform supports, in particular seating columns on baseplates of measuring machines. In this case, there is the problem, inter alia, of accurately manufacturing this seating means which, under certain circumstances, can be used only once. Serious problems are also presented by prismatic workpieces or tubular workpieces or similarly shaped workpiece parts which, for measurement purposes, have to be positioned temporarily, in any axial position, below a spatial position known only from the finished product, or by devices for measuring methods, which require a controlled distance between a seating means and the workpiece, so that a uniform outer contour of the workpiece can be detected by means of a gage.

Proceeding from this, a method was developed for the accurate positioning of devices, such as seating columns and the like, for the temporary fixing of the workpiece in a known three-dimensional working space. It is presupposed, in this case, that the workpiece requires a multidimensional, that is to say spatially, randomly arranged seating and the tool or a measuring head with a measuring tracer can approach all the coordinate points, and the machine is equipped with a computer, as is the case, in particular, in three-dimensional measuring machines. The means made available by the measuring machine, such as collision protection or the transmission of electric control or power signals, can be used in the solution proposed here, in that they are employed, via a corresponding coupling system, on the head of the machine, for example the measuring head, for example as an exchange element for the measuring tracer. Opposite this measuring machine or processing machine, by which is meant, for example, a grinding device or a grinding tool and the like, and also, for example, an erosion tool, is located, as a rule, a baseplate, for example of the measuring plate of the measuring machine, and, on this, a vertically adjustable device freely movable in the X- and Y-axes, usually also designated as seating columns. In the prior art, these seating columns are, as a rule, provided with spherical or such like heads, so that the workpiece can be put in place there.

In the solution according to the invention, it is, of course, also possible to use such balls or standardized seating points unless, according to the invention, special seating means is to be used, which takes into account the multidimensional random spatial position of the workpiece. According to the invention, the seating column or similar device is equipped with a first coupling and the tool, that is to say the head of the machine, is equipped with a corresponding adapter having a second coupling, said device and said tool being movably connected in rotation through 360°. Each of these couplings consists of at least two coupling parts which are connected by means of lockable and pivotally movable intermediate joints, the two couplings temporarily being indirectly couplable to one another. This coupling may take place by means of a spacer piece between the freely movable coupling parts of the device and of the tool respectively or the coupling parts consist, at their free ends, of magnets, for example magnetic plates, which can thus indirectly couple the couplings of the device and of the tool to one another.

It is assumed that the workpiece configuration is available as a drawing or CAD program and that the spatial position of the seating surfaces of the workpiece can also be converted into coordinate points with the aid of the machine. The multidimensional seating thus determined is transposed to the system of coordinates of the working space and an arithmetic reference plane of the seating is then determined with respect to the multidimensional seating. This reference plane serves for fixing an axis which intersects this plane and according to which the entire positioning system can be oriented. The outer coupling parts on the tool are then aligned along the intersecting axis, and fixed, by the locking of the intermediate joint, and the tool is moved toward the arithmetically determined intersecting axis in the working space at a defined distance from the reference plane. This defined distance serves for receiving a spacer piece for coupling to the seating column, then to be aligned with the reference plane, and, if appropriate, for positioning a clamping means and a seating means on the seating column. After a seating column has been preadjusted approximately in the X- and Y-positions and the height (Z-axis) of the corresponding coupling part for the seating device subsequently to be mounted has then been aligned, the adjacent coupling parts of the device and of the tool are aligned so as to be axially true and are then fixed relative to one another. This fixing may take place by the intermediate coupling of a spacer piece of known length, while, at the same time, angular differences may be compensated for for the exact adjustment of the seating columns.

On the other hand, it is possible for the free ends of the coupling parts of the couplings to be equipped with magnetic elements which are then temporarily coupled to one another by means of magnetic forces in the position of the intersecting axis.

After this fine adjustment and alignment of the seating column or device on the baseplate has been carried out, the device is secured both on the baseplate and in terms of height. The couplings of the device and of the tool can then be uncoupled from the spacer piece, and a seating means complementary with the workpiece seating can be inserted into the then freed coupling part of the device or seating column and secured. It must be remembered, in this case, that both the spacer piece and the coupling parts are manufactured with high accuracy and have as little play as possible, so that a repetitive accuracy of <0.1 mm can be guaranteed absolutely. The workpiece, for example an injection molding, can, as a rule, be manufactured with such narrow tolerances, so that a corresponding measuring machine or processing device must, of course, also be produced with similarly narrow tolerances.

In order to make the procedures and device parts used simpler and clearer, the positioning method and positioning system are based hereafter only on a three-dimensional measuring machine and a workpiece which is positioned in the space arranged within the range of the measuring machine and which is held by means of corresponding seating columns known per se. When the system is used with other machines, the average person skilled in the art can adapt to the operation and devices accordingly. Ideally, the number of components of the positioning elements to be used is to be kept as small as possible, on the one hand for reasons of cost and, on the other hand, so as to avoid inaccuracies being added together into relatively large positioning inaccuracies or measuring inaccuracies. One of the couplings to be used according to the invention, both on the head of the measuring machine, being inserted into the device used for the tracer, and on the head of the seating column, consists essentially only of the following elements: an adapter for coupling to the machine or the base of the seating column, an intermediate member allowing the coupling to move through 360°, although this degree of freedom in the X-Y-axis can be fixed by means of any angular lock, and a second coupling part which is to be arranged pivotally movably on this coupling part of the coupling and which is held so as to be pivotally movable relative to the first coupling part over somewhat more than +/−90° in a vertical plane relative to the axis of the latter, the pivot axis necessary for this purpose likewise being capable of being secured in a predefinable angular position. Lastly, it is also necessary, on this second coupling part, to have a fixing element arranged on the free end of the latter, so that an alignment of the complementary coupling part with the coupling of the seating column can be maintained in a defined angular position. Such fixing may be a sleeve which covers a defined spacer piece of known length between the two free coupling parts, or it may be a magnetic holding means, so that the coupling parts can be magnetically coupled to one another. The spacer piece used may, for example, be an accurately dimensioned cylindrical column provided, at both ends, with annular grooves, at which corresponding locking means of the coupling parts can hold this spacer piece. Ideally, the first coupling part and the adapter consist of a stepping motor or servomotor, in which one disk can turn rotationally relative to a second disk over a presettable degree of angle, for example according to an electric signal generated in the computer of a measuring machine. This stepping motor is provided with a forked piece at its end facing away from the machine, the forked piece having, at its ends, a pivot axis which receives in a pivotally movable manner a second motor designed in a similar way to the first stepping motor. This second motor is arranged pivotally movable about the pivot axis between the fork ends and, at its free end, carries a magnetic plate, for example a permanent magnet or else an electromagnet. If the seating is equipped in the same way, the magnets can be coupled to one another, so that the pivoted motors are coupled to one another, at the predefined angle, along the calculated intersecting axis. The joints of the couplings can then be fixed in this position, and the magnetic holding means is then separated. Since the measuring machine has locked on to the correct coordinate point, the seating column has been brought, after pre-adjustment, into a position such that, after coupling with the counterpiece, the pivotally movable motor is located on the seating column in the correct position, so that a workpiece can be supported at the desired location, with the seating surface being in the desired position. If appropriate, a seating means is placed onto the magnetic plate, said seating means being adapted to the contour of the workpiece and bridging a possible distance between the range of the seating column and the actual seating point of the workpiece.

Insofar as stepping motors of this kind cannot be used for the seating column and/or for the measuring head, for example because they are too expensive or too heavy, an auxiliary device, an adjusting device, can be used, which is positioned at a selectable reference location or reference point in the working space on the base plate. An adjusting device of this kind could then be equipped, in the same way as the movable seating column, with corresponding stepping motors, while the seating columns in the measuring machine itself have manual coupling systems. In this case, as described above, for this purpose the measuring machine is first used to determine the position of the workpiece in the working space, to calculate a reference plane and to determine an axis intersecting the reference plane. The adjusting device is then preset accordingly by the stepping motors being moved to the angular position complementary with the workpiece position, or its reference plane, and the intersecting axis. In a further step, one of the couplings described, but in a version to be operated manually, is positioned in the measuring head of the measuring machine, instead of the measuring tracer. This measuring head is then moved to a reference point of the working space, said reference point being located at a defined distance from the head face of the pivotally movable motor of the adjusting device. At the same time, the position of the intersecting axis at the reference point is approached and the coupling on the measuring head is then connected manually with the adjusting device, and the coupling, that is to say its pivot axis and axis of rotation, is subsequently fixed, so that the coupling no longer has any degrees of rotational freedom at the measuring point. After this preadjustment of the coupling, the measuring head is then moved to the desired location in the working space, and, as described above, the supporting column is positioned there, by the couplings being connected to one another and therefore the intersecting axis also being fixed in its X-Y-Z axial position on the supporting device. The couplings are then uncoupled manually, and the support means for the workpiece is inserted into the free coupling end of the supporting column.

If an adjusting device of this type likewise cannot be used, for example because the baseplate is very small or the stepping motors are still too expensive, in this case, too, the adjusting device may be equipped with a manual coupling device, either in the manner of couplings which are also present on the supporting column or on the measuring head or in that the adjusting device consists merely of a reference plinth which, in two or four reference directions, carries reference balls which can be connected by a centering means, in the manner of a union nut connection, to a couplable spacer piece relative to the measuring head. In this case, as described above, the measuring machine approaches the reference point of the adjusting device, and the centering element arranged on the reference ball with play, but positively, is then coupled to the manual coupling of the measuring machine by means of the union nut connection, using a spacer piece, and, in turn, the degree of rotational freedom and the degree of pivoting freedom are blocked on the measuring machine by appropriate locking means. Thereafter, as described above, the supporting column can be set up according to the model of axial inclination at the coupling of the measuring head.

Depending on the desired degree of automation or the outlay for such positioning systems according to the invention, both the measuring machine head, the supporting column and/or an adjusting device may be provided with an electrically or manually adjustable and lockable coupling, and the necessary angular settings on the couplings may be carried out manually or by electric control. In all cases, however, a reference plane or surface for the workpiece seating at a distance from the vertical axes of the supporting column or of the adjusting device, on the one hand, and of the measuring head, on the other hand, must first be defined according to the geometric dimensions of the supporting columns and support means used and with respect to the intersecting axis which, in the simplest case, is orthogonal to the reference plane. The right-angled axial position (in relation to a reference plane centrally between the vertical axes) is obtained automatically, using spacer pieces with parallel annular grooves and manually operable couplings of identical design.

The supporting element or support means, to be inserted into the supporting column, for the workpiece has, in relation to the supporting column, a reference plane, for example the top side of the support means, which is plane-parallel to a surface of the supporting column, so that, in the case of manual variation of the support means, the latter is not rotated or tilted out of the desired spatial position.

In a particular embodiment of the support means, the latter may be provided with a complementary surface to the workpiece surface, but this support means also acquires a further degree of rotational freedom, so that a workpiece contour deviating with respect to the reference plane can be taken into account. This is particularly expedient in the positioning of workpieces, such as pipelines or the like, which do not have two-dimensional seating edges and the support means therefore has to be designed as a multipoint support. It could be the same if the workpiece surface is provided with a three-dimensional structure at the seating point and the surface of the support means has to be aligned in the same way. If the surface of the support means has to be pivoted for this purpose, a bearing with a degree of rotational freedom is arranged on the support means itself, if appropriate with an indicator for the angular position or the arc dimension.

If nonmagnetic coupling parts are used for the above-described spacer piece or the support means, it is necessary for said coupling parts to be guided accurately, which is appropriately carried out by means of a corresponding design of the free end of the coupling part of the respective coupling. Since the spacer piece itself is to have a fixed dimension, adjustable coupling elements cannot be mounted there. For this reason, at least the coupling of the supporting column or the coupling on the measuring head must be equipped with a sleeve engaging over the spacer piece or with elements acting in a similar way, so that the spacer piece can be coupled and uncoupled. In order that the exact distances between the coupling parts can be adjusted with repetitive accuracy, the spacer piece may preferably be provided with annular grooves, in which locking means for the sleeves to be pushed into the spacer piece or coupling parts can be accurately fixed. The spacer piece is held centrally in the direction of the intersecting axis by appropriate centering means within the coupling parts.

Further advantages and details of the device according to the invention and of the positioning method may be gathered from the following description with reference to exemplary embodiments. By means of the measuring machine equipped in this way, a measuring point or a measuring surface can be approached with an accuracy of less than 0.1 mm and the workpiece positioned with corresponding accuracy.

The invention is described in more detail below with reference to a partly diagrammatic and partly concrete drawing in which.

BRIEF DESCRIPTION OF THE DRAWINGS

Identical or identically acting components are given identical reference symbols below.

DETAILED DESCRIPTION OF THE PREFERRED EMBODIMENTS

Figure 1:
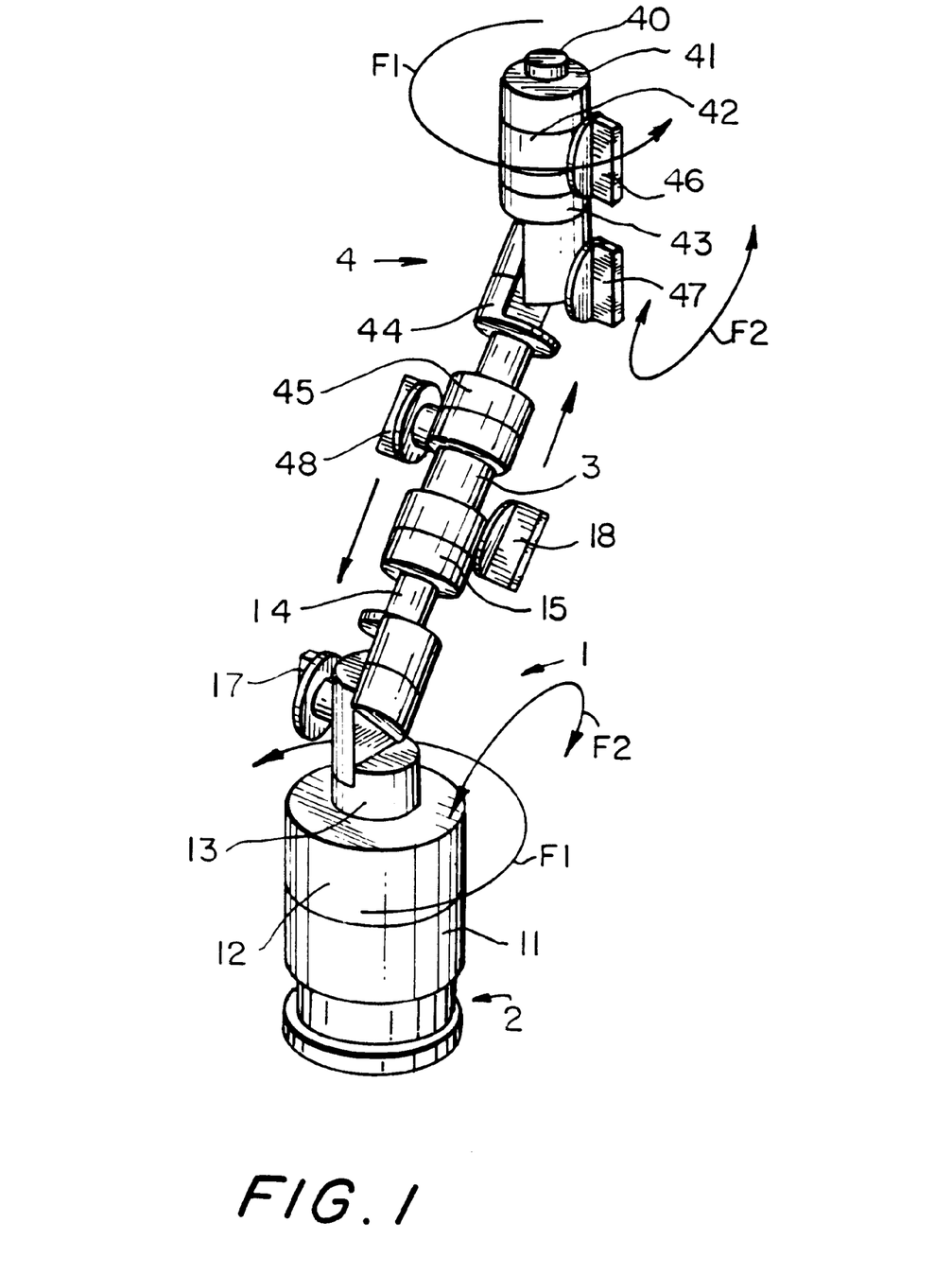
FIG. 1 shows a positioning device with adjusting device, tool and spacer piece.

A positioning system according to FIG. 1, the parts of which consist essentially of light metal, shows the base of an adjusting device 2 provided with a coupling 1 which can be coupled via a spacer piece 3 to a coupling 4 of a tool/machine. A stationary part 11 is provided with a clamping ring 12, by means of which a shaft 13, rotatable through 360° with the degree of freedom F 1, can be locked at any desired angle of rotation relative to the fixed part 11. The shaft 13 is connected to a coupling part 14 which is pivotally movable about the locking means 17 and which has a degree of freedom of about 180°, so that an angle of about +/−90° relative to the longitudinal axis of the part 13 can be set between the shaft 13 and the coupling part 14. Arranged on this coupling part 14 is a part 15 which is designed in the manner of a union nut or slip-over sleeve and which is movable, in the position of rest, in the direction of the locking means 17 or the intermediate joint 13, but, on the other hand, can be slipped over the spacer piece 3 and connected to the latter by the locking means 18. The spacer piece 3 is secured, on the other hand, by a locking means 48, designed identically to the locking means 18, in a slip-over sleeve 45 which is designed in a similar way to the sleeve 15. The sleeve 45 can, in turn, be displaced axially on the coupling part 44, so that the spacer piece 3 can be extracted or inserted between the sleeves 45 and 15. The coupling part 44 forms, with a further part 43 connected in a pivot axis of the locking means 47, an angle which can be designed to be about +/−90° relative to the axis of the part 43 according to the degree of freedom F 2 which is exactly the same as the equivalent degree of freedom on the adjusting device 1, 2. The part 43 is held on the machine side via an adapter 41. The part 43 is capable of being moved with F 1 in rotation through 360° relative to the axis of the adapter 41, but can be stopped by locking means 46 on the clamping ring 42. The part 4 may also be designated, as a whole, as a tool, machine head or measuring head with coupling.

The parts of the positioning system which are illustrated in FIG. 1 make it possible to use a tool or measuring device, with the aid of a measuring machine which can be connected to the journal 40 with the adapter 41, in order to calculate positions of supporting columns accurately in space with the aid of the adjusting device and tool and subsequently to align them. For this purpose, the measuring machine is brought to the illustrated position relative to the base 2, the previously calculated spatial position of the axis being symbolized by a connecting line between the axes of the locking means 17 and 47, previously also called an intersecting axis. The spacing of the axes of the components 41 and 13 is determined by the spacer piece 3 having a fixed length and by the overall lengths of the corresponding coupling parts 14 and 44.

After the measuring machine together with the tool 4 has been moved into the position illustrated, the spacer piece 3 is coupled between the adjusting device 2 and the tool 4 and the locking means 48 and 18 are tightened, so that an accurate spacing of the vertical axes or an accurate length of the relevant portion of the intersecting axis is ensured. The locking means 46 is then actuated, in order to block the degree of freedom F 1, and the fastening means 47 is tightened, in order to block the degree of freedom F 2, after the degree of translational freedom, illustrated by the arrows parallel to the intersecting axis, has previously already been restricted by the fixing of the spacer piece with the aid of the locking means 18, 48.

Figure 2:
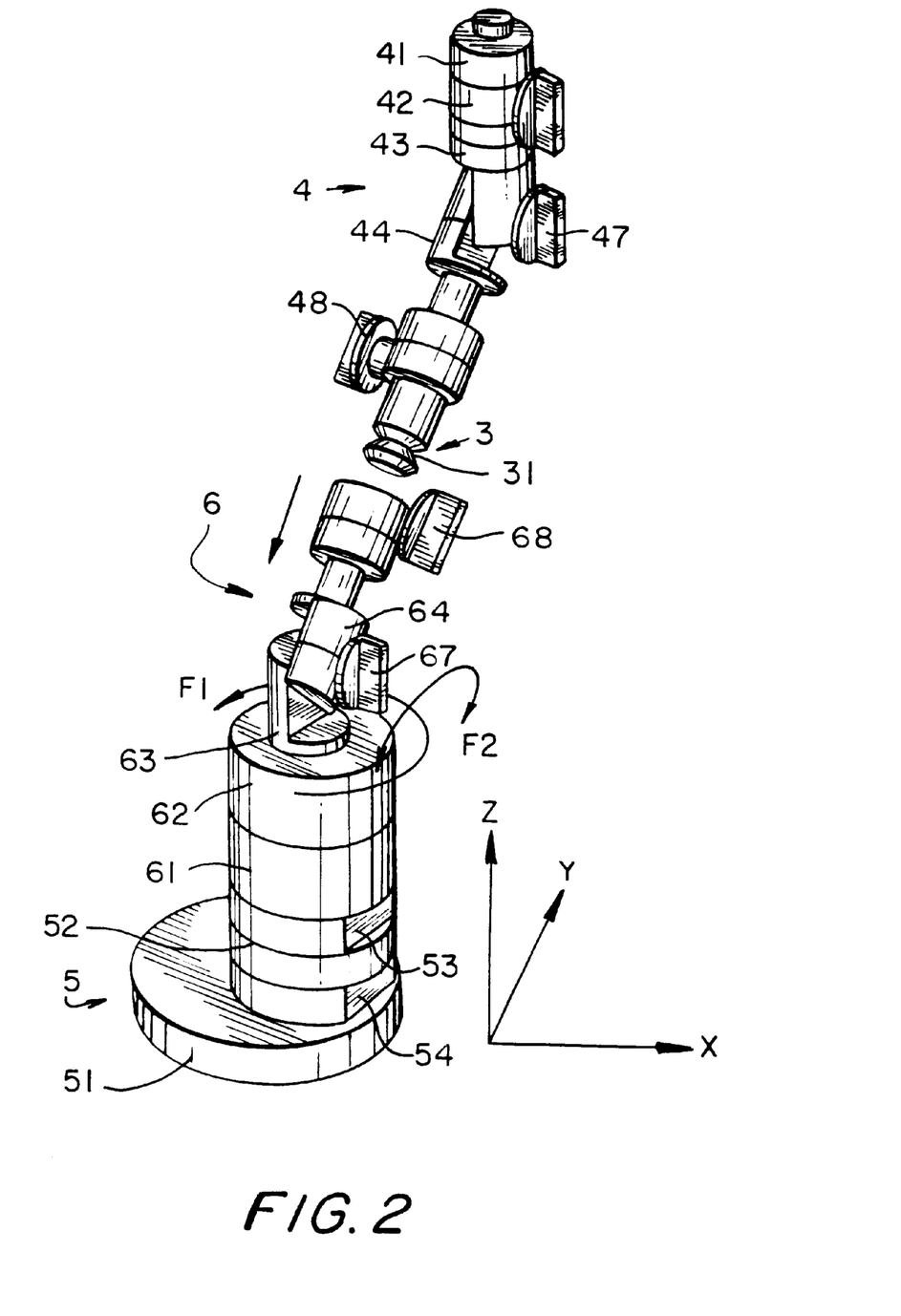
FIG. 2 shows a positioning device with a supporting column, as a vertically adjustable device, as well as a tool and spacer piece, according to FIG. 1.

FIG. 2 shows, then, that the locking means 18 of the adjusting device (FIG. 1) or of the corresponding coupling part has subsequently been released, the annular groove 31 of the spacer piece 3 having been freed, so that the spacer piece 3 has been moved by the tool 4 relative to a supporting column with the coupling 6 and base 5. The base of the supporting column has been preadjusted in the X- and Y-directions and displaced on a base plate (FIG. 8b) in such a way that, within the coupling 6 of the supporting column, a first height adjustment (FIG. 3) can take place in the direction Z of the coupling axis 63 and subsequently the column with the coupling part 64 can be pushed over the spacer piece 3, so that the locking means 68 on the coupling part 64 can engage into the groove 31 of the spacer piece 3 and accurately adjust the connection between the workpiece and supporting column. For this purpose, it is initially unimportant whether the receptacle (part 64) for the spacer piece 3 is movable along the intersecting axis (arrow) and can be pushed over the spacer piece or whether, according to FIG. 8b, the receptacle (part 65) for the spacer piece is fixed on the supporting column and is not designed as a slip-over socket. The advantage of this is that the version according to FIG. 8b is more accurate and allows less play.

Figure 3:
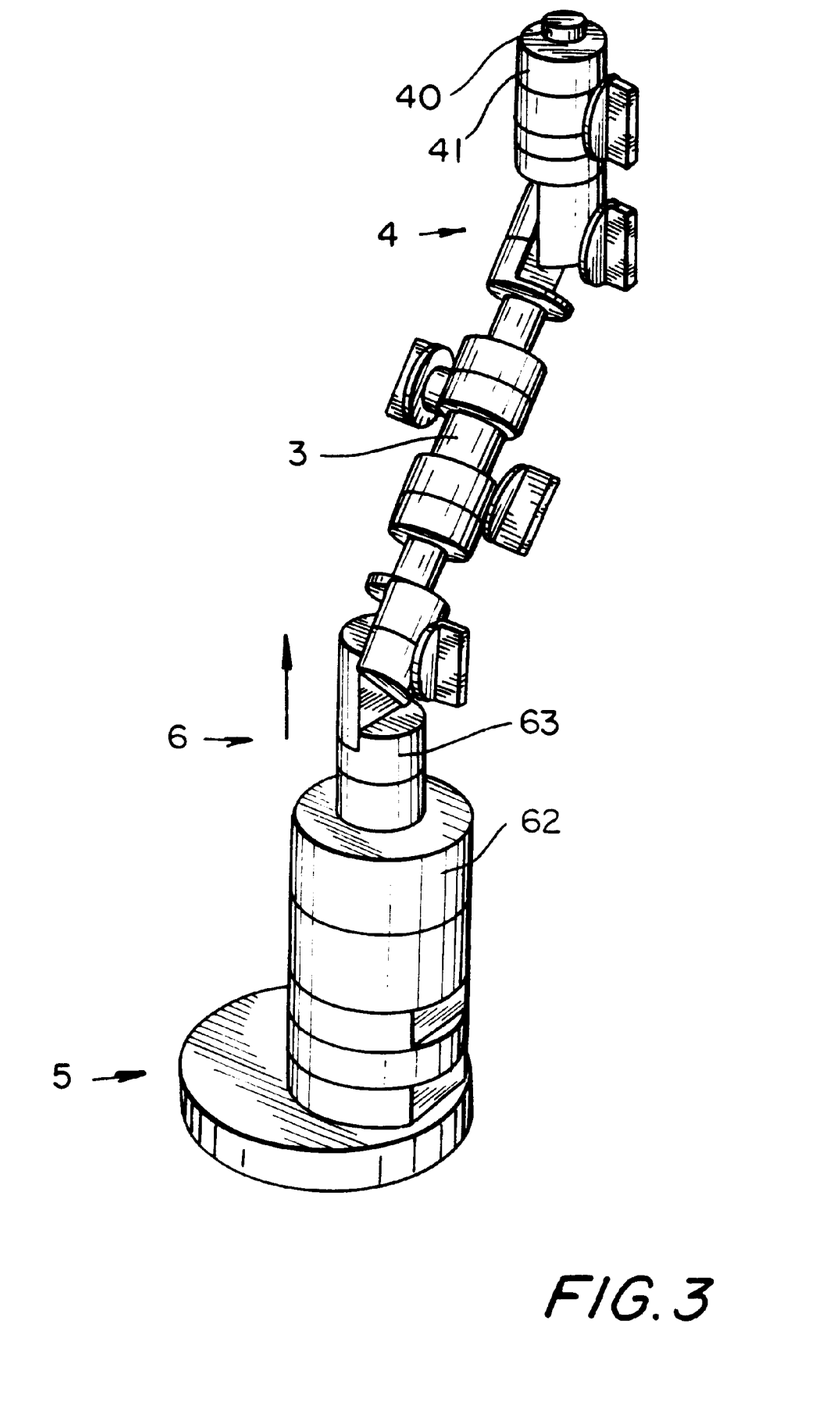
FIG. 3 shows the device according to FIG. 2 in the coupled state.

The supporting column has a stationary part 61 and a clamping ring 62, in which the shaft 63 is movable in rotation according to the degree of freedom F 1 and, at the same time, is adjustable in terms of its height, as shown by the arrow in FIG. 3. The coupling parts 63, 64 are pivotable via the intermediate joint or the locking means 67, movement being possible with a degree of freedom F 2 of +/–about 90°, preferably 2 to 5° in any direction. After the supporting column 5, 6 is coupled to the tool 4, as illustrated in FIG. 3, the locking means 67 for the intermediate joint and a locking means, not illustrated, for the clamping ring 62 are actuated, so that the two degrees of freedom F 1 and F 2 are blocked and the part 64, with its axis, more specifically the intersecting axis defined by the axes of the parts 44, 3, 64, is fixed. During the mounting of the supporting column, the measuring machine with the adapter 41 was moved accurately into the position obtained as a result of the intersecting axis, and into the reference plane, defined by the spacer piece or, for example, its end faces, at a distance from the vertical axis of the adapter.

Figure 4:
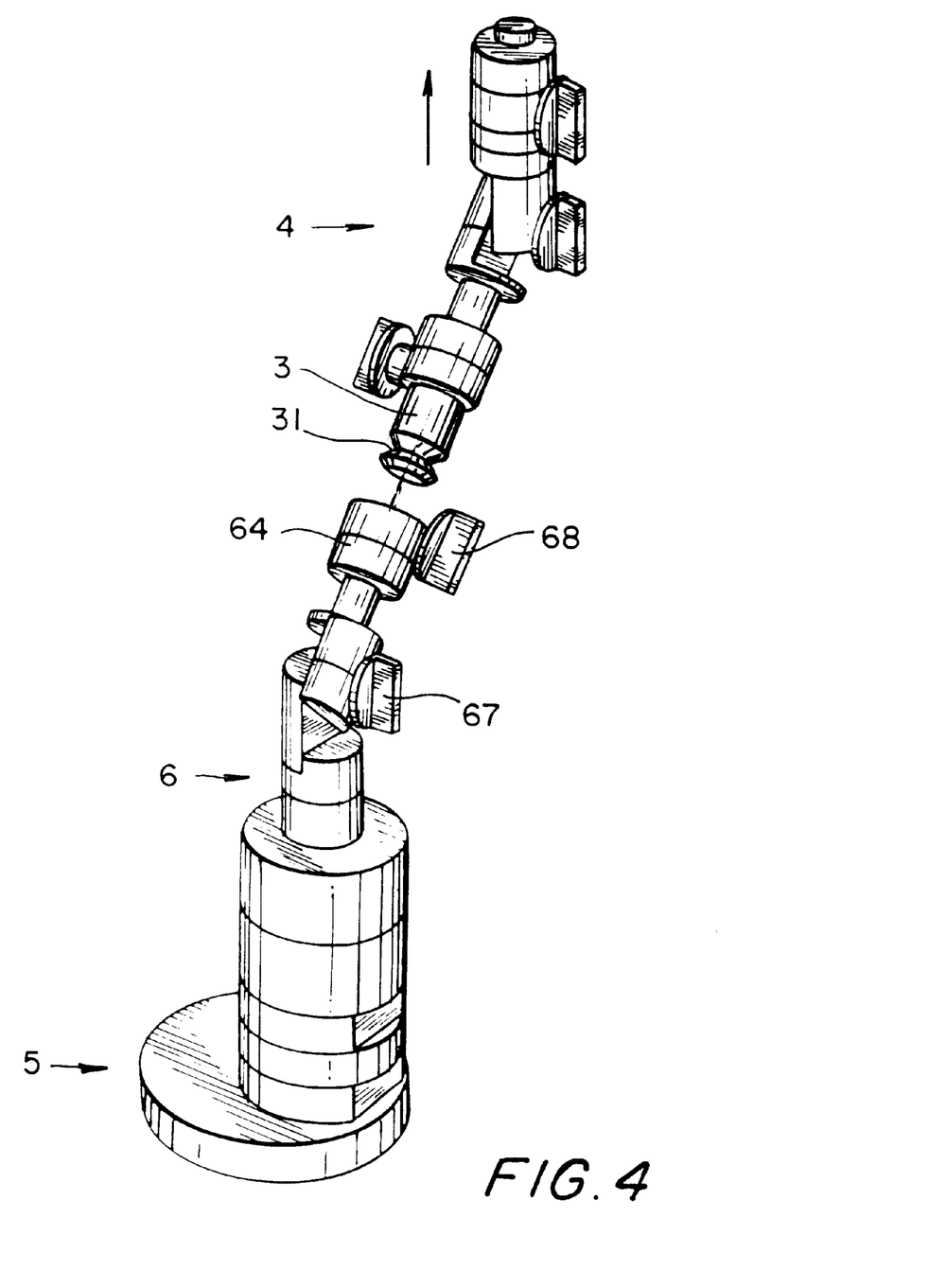
FIG. 4 shows the device according to FIG. 2 after the supporting column has been fixed.

FIG. 4 shows that the locking means 68 is then released, so that the measuring machine together with the tool 4 and with the spacer piece 3 can leave the supporting column. Alternatively, the spacer piece 3 can initially remain in the supporting column and can be extracted later.

Figure 5:
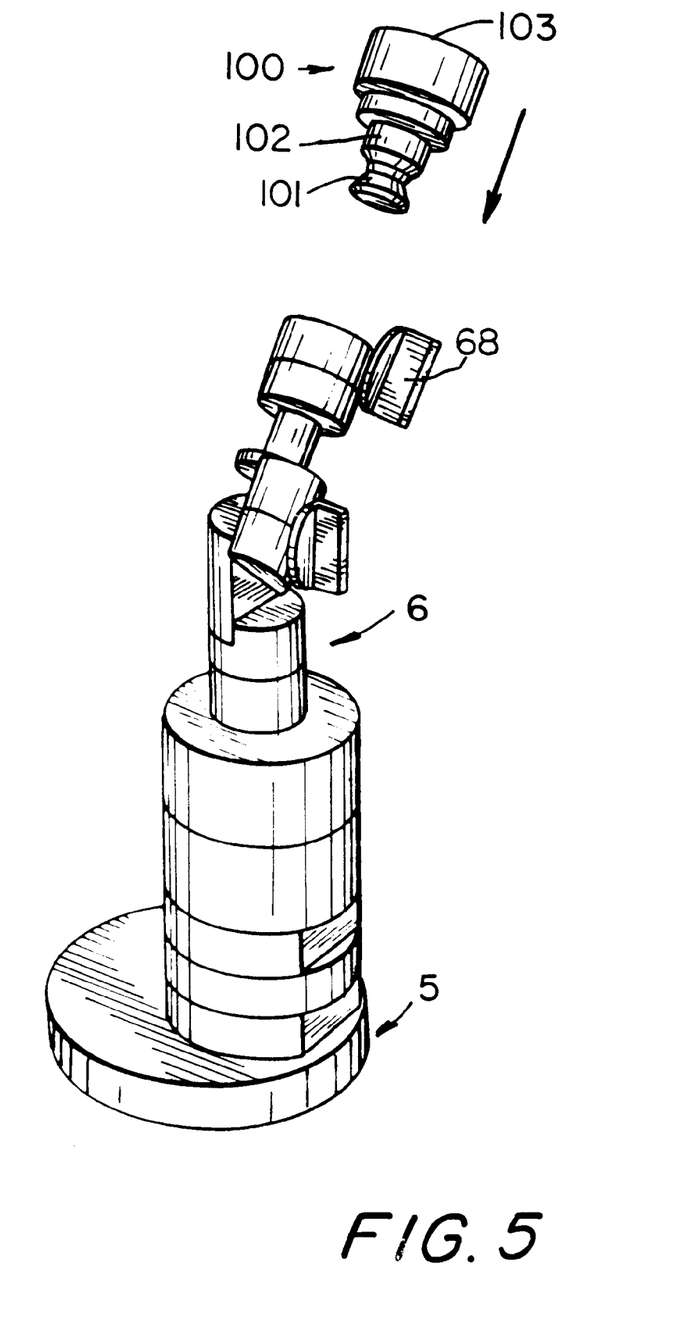
FIG. 5 shows a supporting column with the support means to be inserted.

FIG. 5 then shows that this spacer piece is replaced by a support means 100. The latter is equipped with a surface, its top side 103, complementary with the seating of the workpiece, as well as with a journal 102 and a groove 101 which can be fixed in the exact desired position by the locking means 68.

Figures 6, 7:
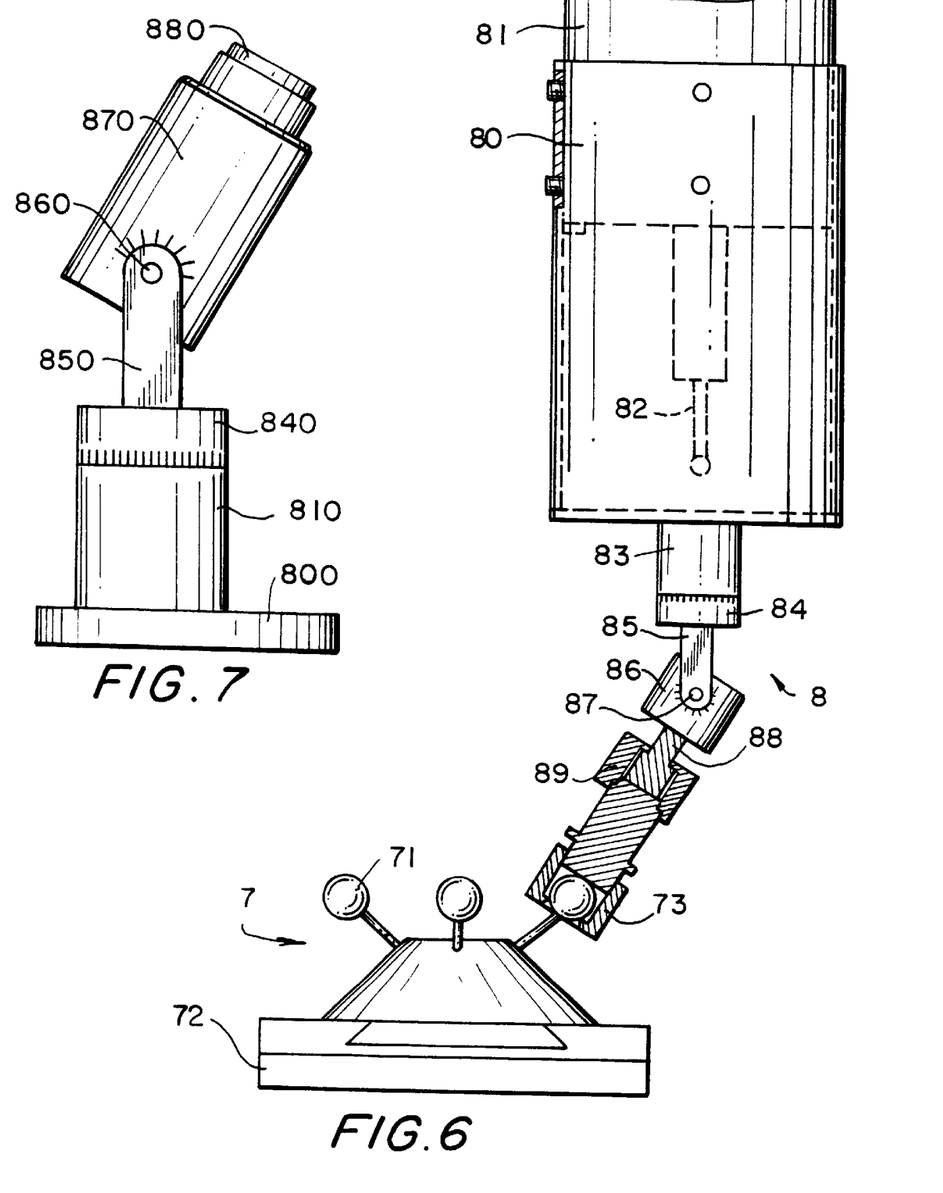
FIG. 6 shows a second form of the adjusting device and a second form of the tool.
FIG. 7 shows a third form of the adjusting device or supporting column.

FIG. 6 shows, instead of an adjusting device 1, 2, an alternative adjusting device 7 comprising a cross slide 72 arranged on a base plate which is not illustrated. Seated on the cross slide 72 are reference balls 71 provided with a union nut sleeve 73 for a spacer piece 33. The tool 8 is designed, here, as a sleeve 80 which can be pushed over the measuring head 81 having a tracer 82. The sleeve 80 has a journal 83, on which are provided a rotational coupling unit 84, with a degree of freedom of 360° about the vertical axis of the measuring head, and a forked piece 85 which is arranged on the coupling part and which itself, in turn, carries a pivoting unit 86 pivotable through +/–95° about the pivot axis 87. Flanged to this pivoting unit 86 is a coupling part 88 provided with a box sleeve 89 for connecting this coupling 88 to the spacer piece 33. In this case, the pivotings of the units through 360° and through +/–95° are executed by means of electrically operated stepping motors or servo-motors which can be controlled by the computer of the measuring machine or the machine moving the measuring head 81, with the result that the corresponding pivot angles or angles of rotation can be transmitted directly from the software program to the positioning means illustrated in FIG. 7. Since the adjusting device 7 is equipped with the balls 71, the axis of the measuring head 81 is freely movable relative to these balls 71 in the way illustrated, specifically with two degrees of rotational freedom, so that the connection from the ball center to the pivot axis 87 ultimately represents the intersecting axis according to the invention.

FIG. 7 shows an alternative adjusting means instead of the cross slide 72 and of the adjusting head equipped with balls, which alternative adjusting means can be arranged at a predetermined location on a measuring machine table or a baseplate 800. To that extent, the device parts 800 to 880 represent a mirror-symmetric version of the above-described design of the tool bearing the reference numerals 80 to 88. Fixed on the machine table 800 is a base unit 810 of an adjusting means, in which a programmable stepping motor is arranged so as to be movable through 360°, said stepping motor being adjustable over a predeterminable angle, for example with a limit switch function. A rotary head 840 holds in a fork 850, at the joint 860, a further rotary head with an integrated programmable stepping motor 870 which is pivotable through +/–100° about a rotary journal, as indicated by the angle scale marks. The stepping motor 870 carries, on its head side, a magnet 880, by means of which, instead of the above-described coupling parts for a spacer piece 3, this spacer piece is accurately fixed magnetically on the adjusting head. Alternatively, of course, the coupling means (FIG. 1) already described as part 1 may also be used on such a stepping motor or pivoting device.

Figure 8A:
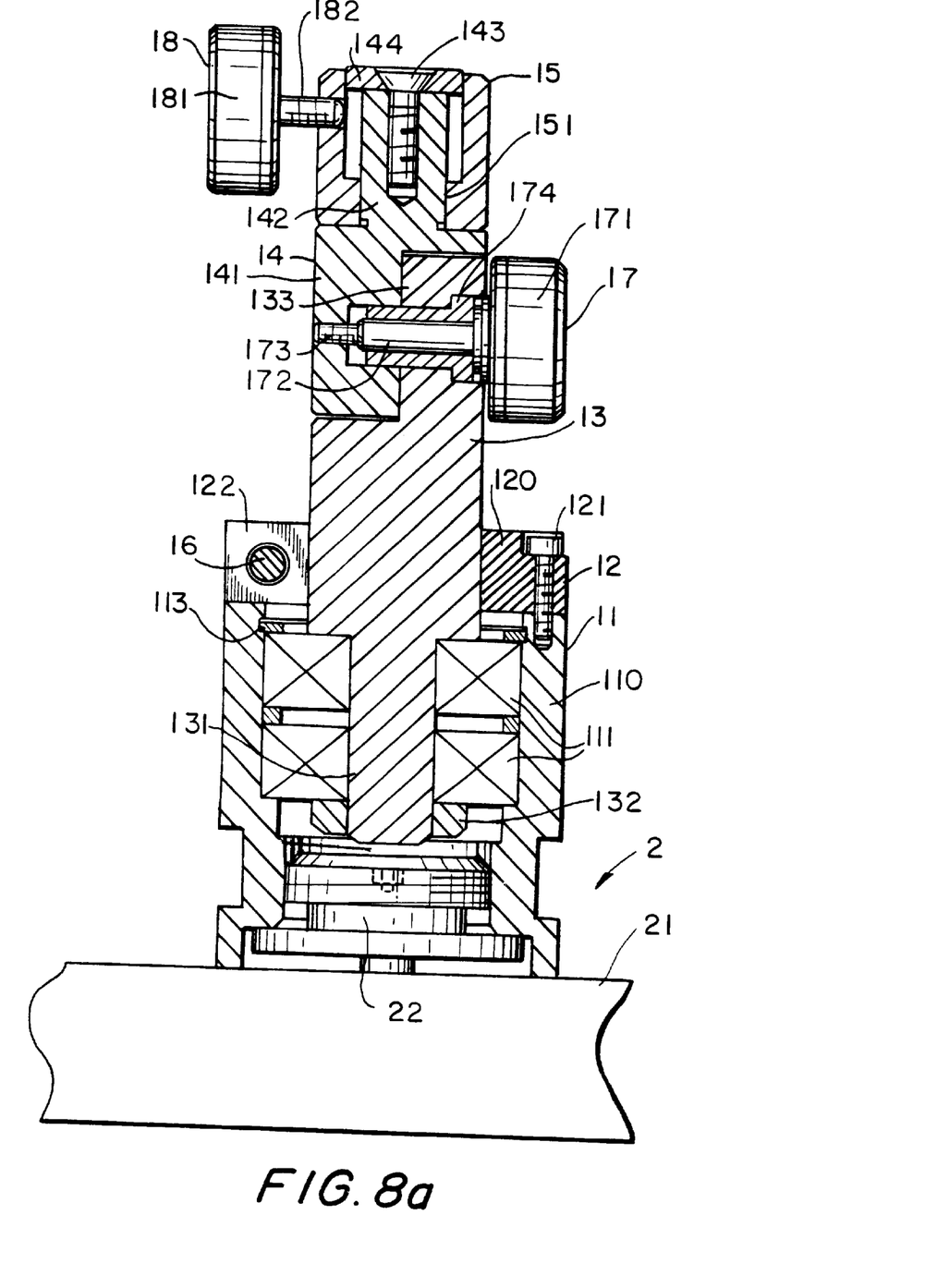
FIG. 8a shows a concrete form of the adjusting device according to FIG. 1 in section.
Figures 8B, 9A:
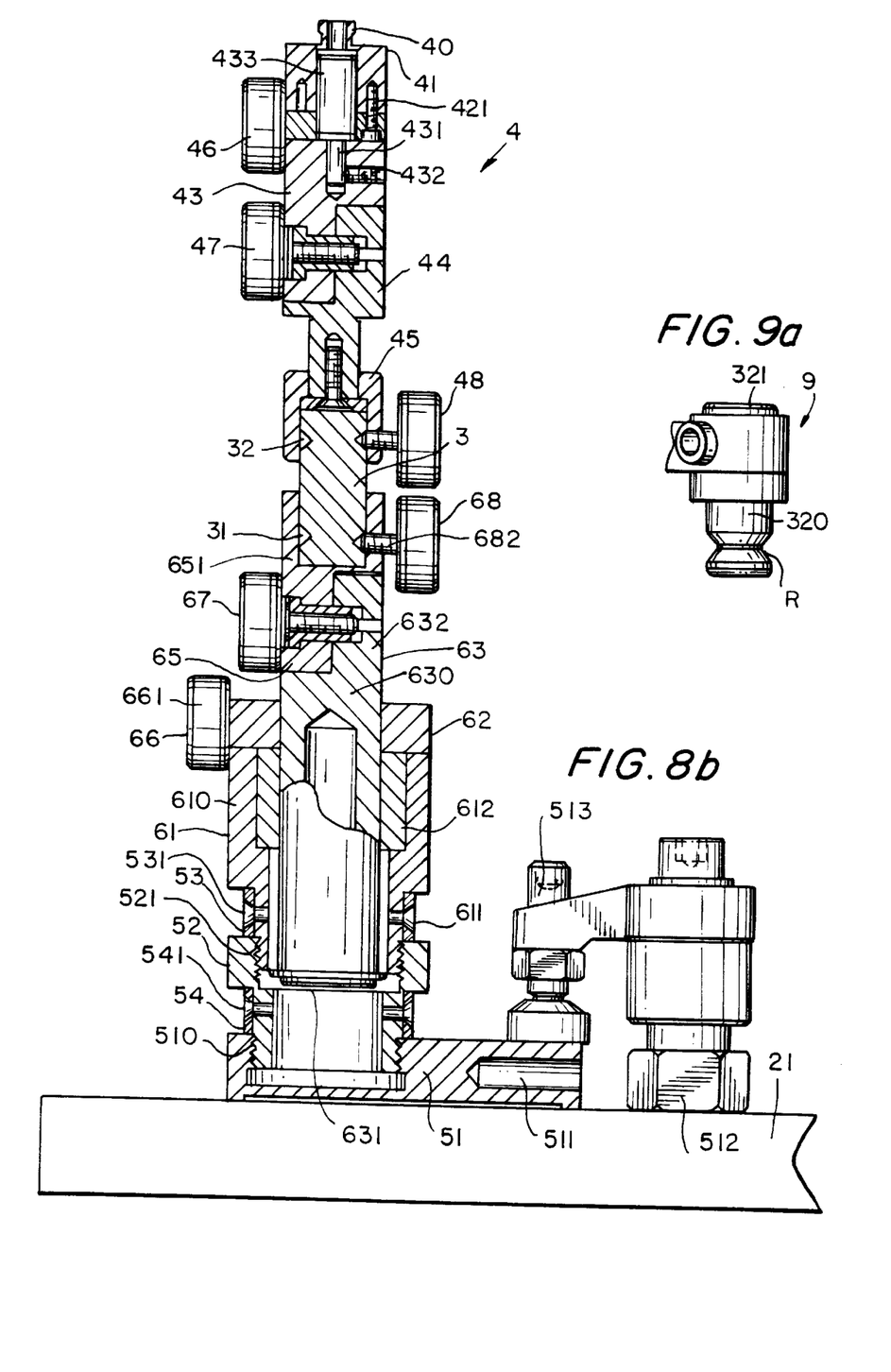
FIG. 8b shows a concrete second form of the positioning system, similar to FIG. 3, in section.
FIGS. 9a–c shows a second and third support means with clamping elements.

FIG. 8 a shows in concrete form, as compared with FIG. 1, an adjusting device having the parts 1 and 2. The part 2 comprises, here, a baseplate 21 and a fixing means 22 for the stationary part 11 of the coupling 1. Two axial and radial bearings 111 are fixed on the threaded journal 131 in a sleeve shaped housing 110 by means of a spring ring 113 and a nut 132. The threaded journal 131 belongs to the shaft 13 which is thus mounted freely movably in rotation, but, on the other hand, accurately and free of play, in the housing 110. The clamping ring, designated as a whole by the numeral 12, consists of a slotted torus 120 which is fixed, on one side, to the housing 110 by means of screws 121 while, on the other side, a clamping screw 16 passes through the slot 122, in order to block the degree of rotational freedom of the shaft 13. The shaft 13 terminates in the half shaft or the journal part 133 which is connected to a complementary journal part 141 over the part 14 by the locking means 17. The locking means comprises a wing nut 171 having a sliding journal 172 which terminates in a threaded journal 173. The sliding journal 72 is seated in a drilled bush 174 which bridges the two journal parts 133, 141, while said sliding journal 172 can be screwed into a threaded bore of the journal part 141, so that the coupling-side head of the wing nut 171 secures the journal part 133 by clamping against the journal part 141. The part 14 terminates in a central guide part 142 having about half the diameter of the largest dimension of the journal 14. Fixed to the head of the guide part 142 by means of a screw 143 is a collar disk 144, so that the sleeve 15, with its collar 151 sliding on the guide 142, cannot fall off from the part 14. The locking means 18 provided with a wing nut 181 having a threaded journal 182 passes through the sleeve 15 in a thread, not illustrated, and thus, according to FIG. 1, a spacer piece 3 can be fixed in the groove 31.

FIG. 8b shows, in a design similar to that of the adjusting device, a device which is designed as a supporting column, the fixed part 5 comprising a plinth (base unit) 51 with an internal thread 510 which is capable of being fixed on a baseplate 21 with the aid of a clamping device 511 or 512, 513. If required, an extension 52 having an external thread can be screwed into this base unit 51, into the thread of the latter. The steel plates 53, 54, which are fixed by means of screws 531, 541, define surfaces for applying fork wrenches, so that the threaded parts can be tightened relative to one another. The extension 52 may be designed at any desired column height. The extension 52 also carries an internal thread 521 and can receive therein the stationary part 61, having an external thread 611, of the coupling 6. The stationary part 61 of the coupling consists of a sleeve 610 with an inner guide bush 612 for the shaft 63 which is movable in the guide bush 612 both in rotation and in the axial direction of the shaft. The translational movement of the shaft in the Z-direction is limited by a spring ring 631 in interaction with the bash 612. The largest diameter 630 of the shaft 63 can be fixed with a clamping effect, both in the direction of rotation and in the direction of translational movement, with the aid of the slotted ring 62 as well as the locking means 66 with the wing nut 661. The journal 632 of the shaft 63 is locked no:positively, in the pivot angle position of said shaft, with a similarly designed journal 651 by the locking means 67 which is identical to the locking means 17. The part 651 may be designed in a similar way to the part 14 or 64, but it is more advantageous to dispense with a slip-over sleeve similar to the sleeve 15 and, instead, design the part 651 with rotationally symmetric inner centering as a flange of said part. A spacer piece 3 with grooves 31 can be fixed in this centering of the flange by a corresponding locking means 68 which is designed to be identical to the locking means 18. It can be seen clearly that the pin 682 bears with its head on a flank of the groove 31 and thus ensures that the spacer piece 3 is clamped, free of play, relative to the locking device 48 in the groove 32 of said spacer. The sleeve 45, coupling part 44 and locking means 47 are designed in the same way as the sleeve 15, coupling part 14 and locking means 17. The locking means 47 clamps to the coupling part 44 a shaft piece 43, in which is centrally fixed by means of a screw 432 a shaft 431 which, on its larger collar 433, supports an adapter 41 in a rotationally movable manner. The adapter 41 terminates in a connecting thread 40 connecting with a machine tool or measuring machine. The adapter 41 is connected to a clamping ring 42 by means of a screw 421. This clamping ring 41 is slotted and can be clamped by the locking means 46 by means of a wing nut illustrated, so that the rotational movement of the shaft 431 in the adapter 41 is blocked. On the other hand, as has already been described above, the part 43 can be connected to the part 44 so as to be pivotally movable about the locking means 47, previously also called an intermediate joint. The adapter 41 or the connecting thread 40 may, if appropriate, be adapted to a receptacle of a measuring machine head in such a way that a signal connection from the computer of the measuring machine or an electric line for drive energy can be fed into the tool generally designated as the part 4.

The purpose of these connections is, for example, to make it possible to utilize further the collision sensors conventional in the case of measuring tracers or to drive energy for the stepping motors, which together form this tool 4 or are parts of this tool, or to transmit regulating commands to these.

Figure 8C:
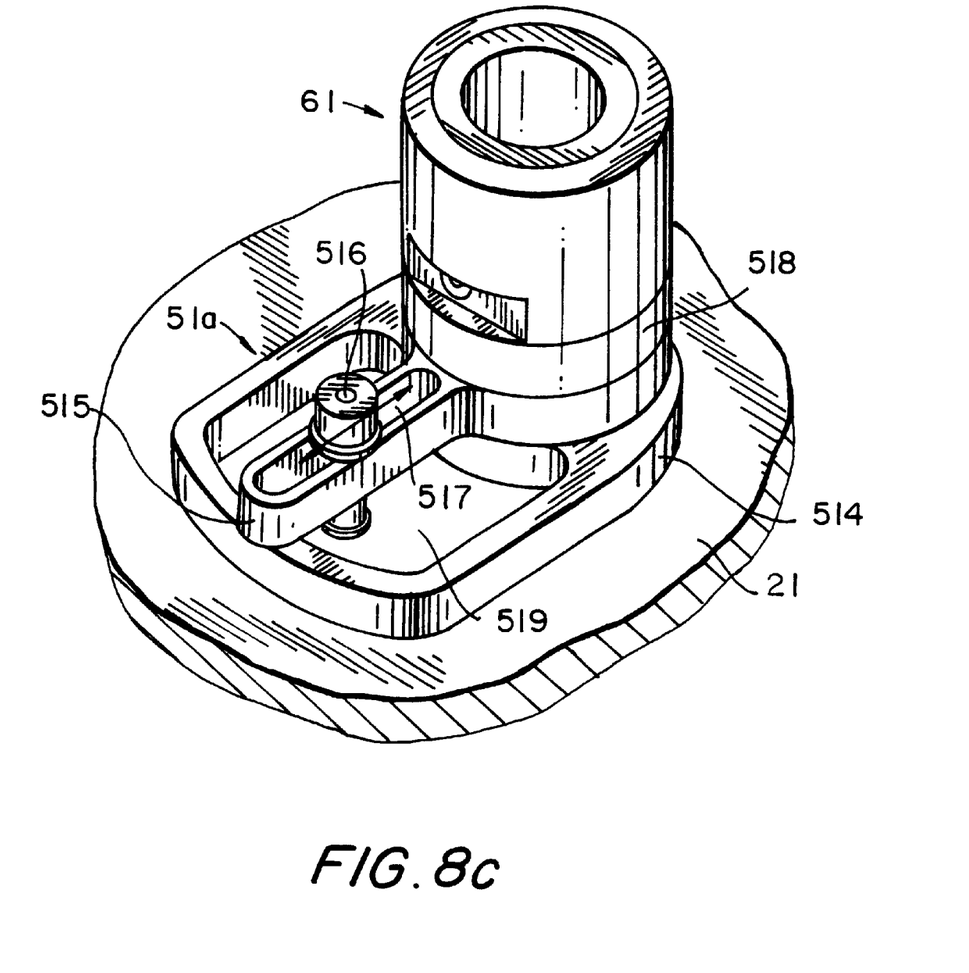
FIG. 8c shows a concrete alternative plinth for a positioning system.

FIG. 8c shows an alternative to the plinth 51 to be clamped or the clamping device 511 to 530 according to FIG. 8b on a baseplate 21. The baseplate 21, a plane clamping table with grooves or holes at grid intervals, serves for supporting and fixing the plinth 51 a of a column illustrated merely by the part 61. The foot plate 514 can be positioned freely on the baseplate 21. Said foot plate 514 has a perforation 519 which is partially congruent with the long hole 517 in the intermediate ring 515. The intermediate ring 515 and an adapter ring 518 are both or individually freely movable in rotation, in the direction of the arrow, relative to the foot plate 514 and the column part 61, respectively. It is thereby possible for the screw 516 to be displaced in the direction of the arrow in the long hole 517 and at the same time in the perforation 519, until it can engage in a complementary nut, perforated block or tenon block, not illustrated, in the baseplate 21 and thus fix the column.

FIG. 9a shows a clamping means, provided as a whole with the numeral 9, which is coupled to a support means 320 and which has a similar appearance to the spacer piece 3, in particular is provided with an annular groove R, so that the support means 320 can be held with the locking means 68. The actual supporting surface for seating a workpiece is designated by 321.

Figure 9B:
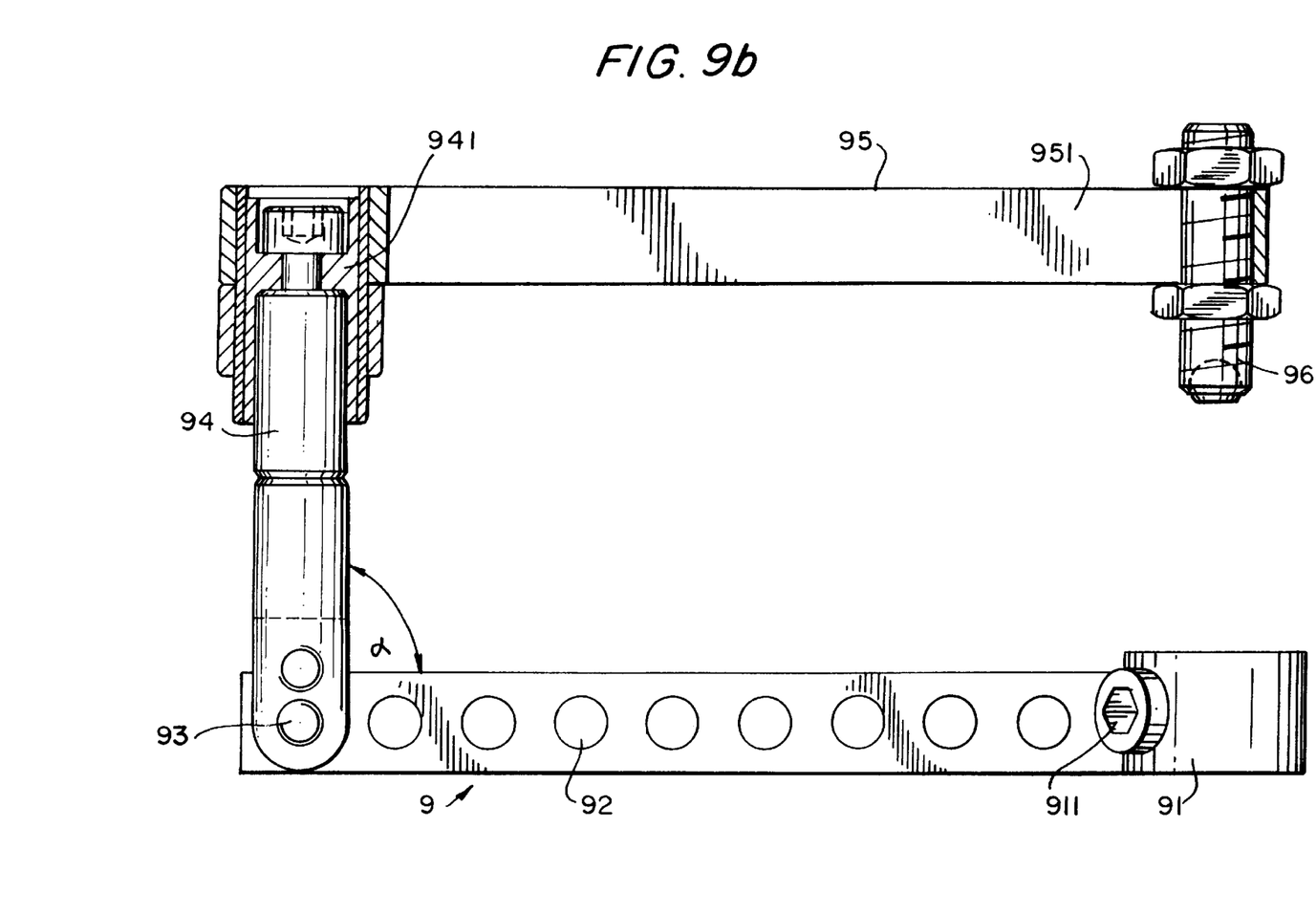

FIG. 9b shows the clamping means 9 with the clip 91 for engaging round a support means 310 to 370 (FIG. 10), the support means being fixed to the clip by means of the screw 911. A first lever 92 has a multiplicity of holes for a column 94 which is connected to the lever 92 in a pivotally movable manner by means of a rotary joint 93. The lever 94 has itself, at its free end, a pivoting joint 941 with 360° of rotational freedom and is coupled, in the rotary joint, to a claw 95 which, at its free end, carries a clamping bolt 96 which can be displaced along the claw 95, within the long hole or slot 951, in such a way that said clamping bolt can be adjusted, in each case via the clip 91, according to the offset of the center of a rotation 93.

Figure 9C:
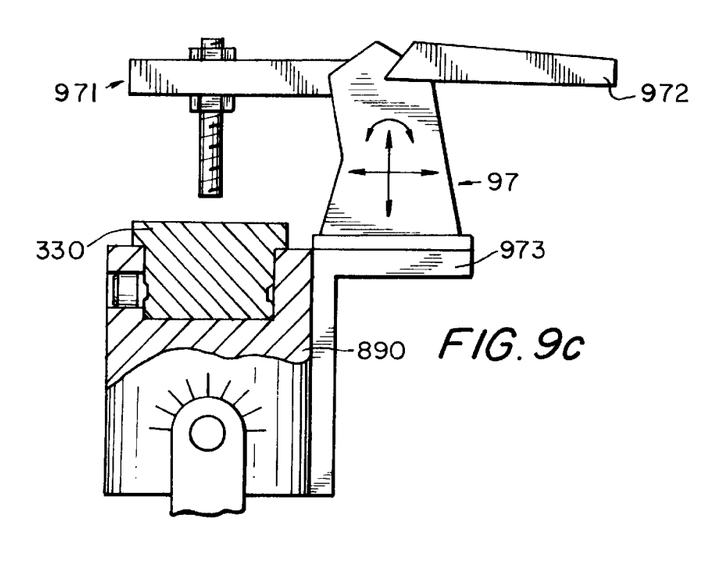
Figure 10A:
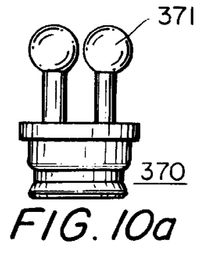
FIGS. 10d–f shows different forms of support means.
Figure 10B:
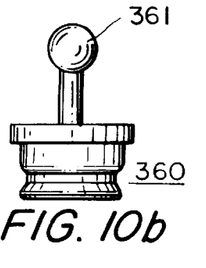
Figure 10C:
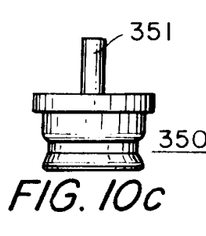
Figure 10D:
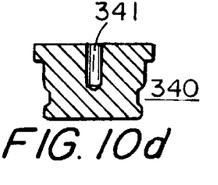
Figure 10E:
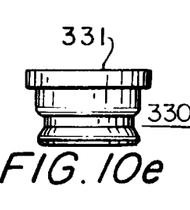
Figure 10F:
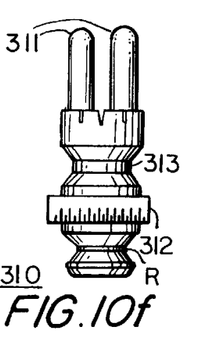

FIG. 9c shows another possibility for clamping workpieces with the aid of a tensioner 97 which is fastened on the head 890 of a device 870 (FIG. 7) by means of screw. The tensioner 97 is built on the base 973, the base being itself fastened to the head 890 (in a similar way to FIG. 7). Depending on the movement of the lever 972, the claw 971 or the tensioner 97 itself can be moved in the direction indicated by the arrows and, thus adapted, can in each case find the correct clamping point for the claw 971 relative to the support means 330.

FIG. 10a–10f show various support means 310–370 which can be inserted into the coupling part 652, and the support means 310 can be locked there, in its annular groove R, by the locking means 68. If necessary, a further clamping means can be coupled to the annular groove 313, with the aid of which clamping means the multidimensional support 311 of a workpiece not illustrated, for example a pipeline or a prism, can be additionally fixed. 312 designates a pivot mounting with angle scaling or a vernier, said pivot mounting making it possible for the journals of the multidimensional support points 311 to be adapted additively to the position of the workpiece after the support means 310 has been clamped.

The further support means for use with the supporting columns 5, 6 are shown in a similar way, the respective surfaces 331 to 371 being adapted to the corresponding contour of a workpiece. Thus, for example, annular workpiece faces can be supported by means of the surfaces 351 and 361, while the surface 341 makes it possible to use any desired supporting contour adapted to the workpiece contour. At the same time, in this case, the circular top surface or underside of the support means may serve as a reference plane, while the vertical center line of this support means coincides with the intersecting axis.

What is claimed is:

1. A method for accurately positioning a device for temporarily fixing a workpiece in a three-dimensional working space of known coordinates, the workpiece requiring a multidimensional seating, use being made of a machine that is computer-guided and designed to be capable of approaching all coordinates with a tool, and of a vertically adjustable device freely movable on a baseplate, the device being connected in a rotationally movable manner to a first coupling and the tool being connected in a rotationally movable manner to a second coupling, each coupling comprising at least two coupling parts which are connected by means of lockable and pivotally movable intermediate joints, and the two couplings being temporary couplable indirectly to one another, the method comprising the steps of:

a) determining a spatial arrangement of the multidimensional seating in the working space with a computer;

b) determining a reference plane of the seating and an axis intersecting the reference plane;

c) fixing a coupling part of the second coupling to the tool, after the intermediate joint of the second coupling has been secured in the direction of an intersecting axis;

d) moving the tool toward the intersecting axis at a defined distance from the reference plane;

e) connecting a further coupling part of the second coupling to a coupling part of the first coupling which is approximately preadjusted, and subsequently fixing the coupling parts of the first coupling in an axial direction defined by the second coupling;

f) securing the device on the baseplate and in terms of its height; and     g) uncoupling the couplings and inserting support means, complementary with the seating on the workpiece, into a free coupling part of the first coupling.

2. A method as defined in claim 1, wherein step c includes using manually one of rotationally and pivotally movable couplings, the fixing in step c initially including moving the tool, in an intermediate step, to a reference point of the working space which is located on an axis parallel to the intersecting axis, at a defined distance from an adjusting device positioned at a defined location on the baseplate and having the first coupling and, after the adjusting device has been coupled to the second coupling, securing the intermediate joint of the second coupling, step e) including a first substep of securing the intermediate joint of the first coupling after indirect connection of the coupling parts of the two couplings.

3. A method as defined in claim 1, including holding each of the couplings so as to be pivotally movable through 360° in a plane parallel to the baseplate and so as to be pivotally movable through about +/−90° in a plane vertical thereto.

4. A method as defined in claim 1, wherein an electrically adjustable coupling is used, steps c and e including positioning the coupling in at least one plane in relation to a solid angle of the intersecting axis by electric signals with aid of coordinates and angle values determined by a computer.

5. A method as defined in claim 1, including temporarily connecting the couplings on the device and the tool with a spacer piece of known length for compensating for at least one of an angular difference and a system related distance from the reference plane.

6. A positioning system for accurately positioning a support device for temporarily fixing a workpiece in a three-dimensional working space of known coordinates, the system comprising:

a machine;

a computer operatively connected to the machine for control thereof, the machine including a triaxially movable head for one of a tool and a measuring tracer;

a baseplate;

devices, freely movable and lockable on the baseplate so as to form a support column for the workpiece to be process; and     a coupling system for temporarily coupling the head and the support column for accurate positioning the support device on the support column under a seating of the workpiece, the coupling system comprising a respective identically acting coupling on the head and on the support column, each coupling having two coupling parts and an intermediate joint that connects the coupling parts together so that one of the coupling parts has a degree of rotational freedom of 360° and another of the coupling parts has, perpendicularly thereto, a degree of rotational freedom of about 180°, the coupling system further including locking means for securing the coupling parts relative to one another and relative to the head and the support column at a selectable angle.

7. A positioning system as defined in claim 6, and further comprising an adjusting device, positionable on the baseplate, for alignment of the coupling on the head.

8. A positioning system as defined in claim 7, wherein the adjusting device has one of an identically acting coupling and a coupling having a reference ball with centering means, so as to form a union nut in connection with a part to be coupled.

9. A positioning system as defined in claim 6, wherein the support column has support means which, in a desired position, has a coupling side seating surface parallel to a reference plane of the workpiece seating.

10. A positioning system as defined in claim 9, wherein the support means has a fixed length.

11. A positioning system as defined in claim 9, wherein the support means has a workpiece side with a surface complementary to a contour of the seating of the workpiece.

12. A positioning system as defined in claim 9, and further comprising clamping means for the workpiece, the support means being connectable to the clamping means.

13. A positioning system as defined in claim 6, wherein each coupling has:

a first coupling part with a central guide for a part to be coupled, a socketlike sleeve part and a lock for a connection of the sleeve part to the part to be coupled;

a second coupling part with a central shaft and an adapter arranged so as to be freely movable in rotation through 360° thereto an lockable, for a connection to one of a device and a machine;

and an intermediate joint that connects the coupling parts in a pivotally movable manner, the joint having locking means for securing the coupling parts at an angle relative to one another in a range of about +/−90°.

14. A positioning system as defined in claim 13, wherein at least one of the sleeve part and the adapter is a sleeve capable of being slipped over the parts to be coupled, the sleeve part being longitudinally movable parallel to an axis of the central guide, the adapter being rotationally movable relative to the guide.

15. A positioning system as defined in claim 13, wherein at least one of the coupling parts is one of a stepping motor and a servomotor which is movable in rotation over a predeterminable degree of angle.

\* \* \* \* \*